United States Patent [19]

Ogawa

[11] Patent Number: 4,829,841
[45] Date of Patent: May 16, 1989

[54] ROTARY DRIVING DEVICE

[75] Inventor: Kenji Ogawa, Musashino, Japan

[73] Assignee: Nueberg Company Limited, Tokyo, Japan

[21] Appl. No.: 129,721

[22] Filed: Dec. 7, 1987

[51] Int. Cl.⁴ .............................................. F16H 31/00
[52] U.S. Cl. ...................................... 74/127; 74/143; 280/253
[58] Field of Search .................... 74/127, 143; 280/253

[56] References Cited

U.S. PATENT DOCUMENTS

| | | | |
|---|---|---|---|
| 598,681 | 2/1898 | Root | 74/127 |
| 771,864 | 10/1904 | Eager | 74/127 |
| 1,213,733 | 1/1917 | Braunbeck | 74/127 |

FOREIGN PATENT DOCUMENTS

| | | | |
|---|---|---|---|
| 34259 | 5/1929 | France | 74/127 |
| 462636 | 3/1951 | Italy | 74/127 |

Primary Examiner—Allan D. Herrmann
Attorney, Agent, or Firm—Flynn, Thiel, Boutell & Tanis

[57] ABSTRACT

This invention relates to a rotary driving device, wherein a rotation and an axial movement of an input shaft are imparted to intermediate members as a rotary movement through a torsional connection, whereby the rotary movement of the intermediate members is imparted to an output shaft through a clutch mechanism. This rotary driving device can be used as a driving device in a bicycle for example. Without utilizing the conventional device wherein a chain, a sprocket and the like are used, a rocking movement of a pair of rocking arms connected to the input shaft makes it possible to advance the bicycle.

7 Claims, 9 Drawing Sheets

ROTARY DRIVING DEVICE

BACKGROUND OF THE INVENTION

1. Field of the Invention

This invention relates to a rotary driving device wherein a movement of an input shaft is imparted to an output shaft as a rotation only in one direction.

2. Description of the Prior Art

As a rotary driving device wherein a movement of an input shaft, e.g. a rotation is imparted to an output shaft as a rotation in one direction, there has heretofore been known a one-way clutch. This one-way clutch has been provided in a bearing portion of a rear wheel of a bicycle for example. In the bicycle provided with the one-way clutch, a rotation of a pedal of a body frame is transmitted to a rear wheel through a sprocket and a chain to obtain a driving force. However, such disadvantages have been presented that the number of parts as a whole increases, so that the one-way clutch cannot be provided inexpensively, and further, the chain and the like cannot be completely sealed, so that maintenance cannot be made completely free. The above-described situation is true of a roller-through, a buggy, a handle-driven wheelchair and the like, in addition to the bicycle. Furthermore, the one-way clutch has been disadvantageous in that the side, to which is not imparted a rotation, during rotation, a rotary force is relieved through an engaging pawl against the resiliency of a spring, thus increasing loss of energy.

SUMMARY OF THE INVENTION

An object of the present invention is to provide a rotary driving device wherein, in imparting a movement of an input shaft to an output shaft only as a rotation in one direction, the number of parts is small, so that the device can be provided inexpensively, and further, the device can be completely sealed in construction as necessary to easily make maintenance free.

The present invention has been developed on the basis of that, in imparting a movement of an input power as a rotation of the output shaft need not necessarily be a rotation and may be a movement in the axial direction thereof, and further, when a rotation reverse to the rotating direction to be given to the output can occur, a clutch mechanism being completely free from frictional contact is used.

To achieve the above-described object, the present invention contemplates in that, specifically, the rotary driving device includes:

an input shaft driven at least in the axial direction thereof;

an axial movement-rotation converting and transmitting mechanism for converting this axial movement of the input shaft into a rotary movement accompanying an axial movement of an intermediate member through a torsionally connected portion and transmitting the same; and a clutch mechanism being connected to or disconnected from the intermediate member due to an axial movement of the intermediate member, for imparting a rotation of the intermediate member to an output shaft due to a frictional force when connected; wherein, for example, a rocking arm or arms as being a driving source are mounted to the input shaft through a rotation-axial movement converting mechanism to rock the rocking arm, or a piston rod of a cylinder as being a driving source which makes a straight-lined movement is mounted to the input shaft, and, when this piston rod is moved in the axial direction thereof, the output shaft can be rotatably driven only in one direction through the above-described arrangement and necessity of a sprocket, a chain and the like can be eliminated.

DETAILED DESCRIPTION OF THE PREFERRED EMBODIMENT

The embodiments of the present invention will hereunder be described with reference to the accompanying drawings.

Figure 1:
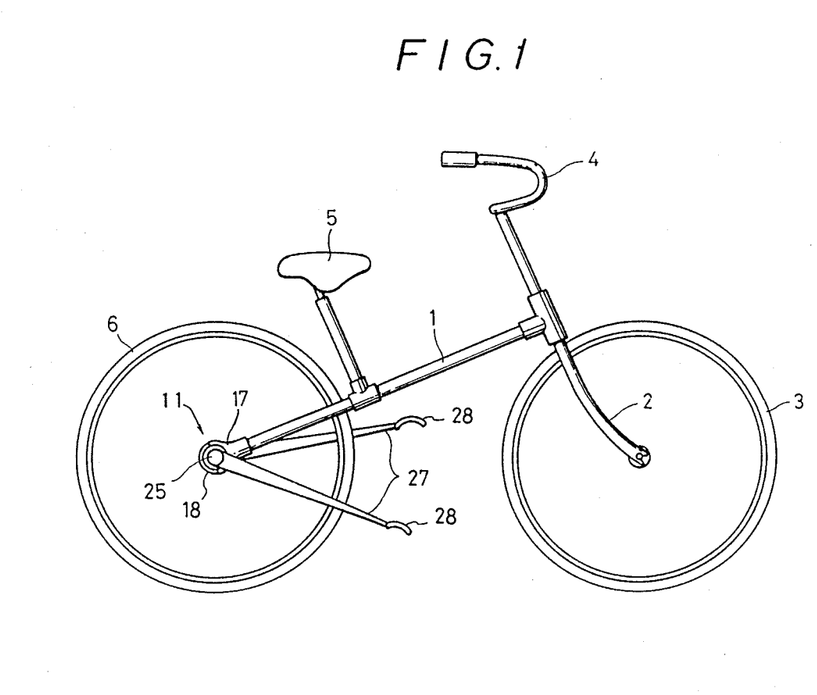
FIG. 1 is a side view showing the general arrangement of a first embodiment of the rotary driving device according to the present invention, being applied to a bicycle.

FIG. 1 shows the first embodiment of the rotary driving device according to the present invention, being applied to a bicycle. Referring to the drawing, a front fork 2 is rotatably secured to a body frame 1, the front fork 2 is secured thereto with a front wheel 3 and a handlebar 4, the body frame 1 is secured thereto with a saddle 5 and a rear wheel 6, and a rotary driving device 11 is provided in a bearing portion of the rear wheel 6.

Figure 2:
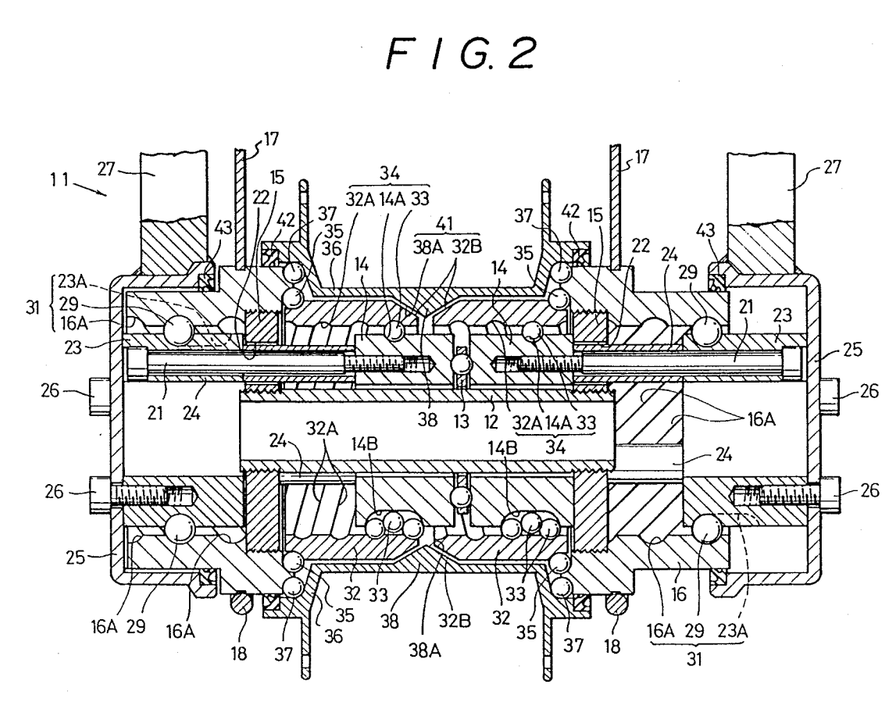
FIG. 2 is a sectional view showing the above rotary driving device.
Figure 3:
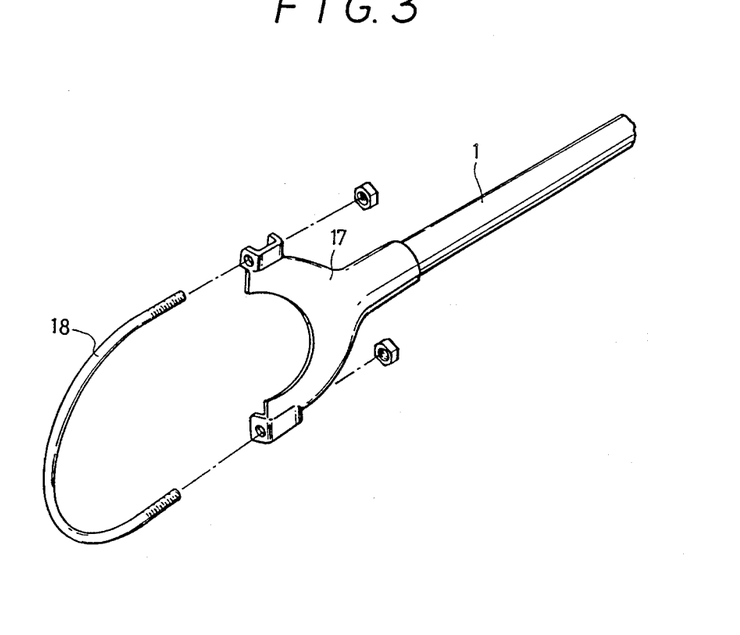
FIG. 3 is a disassembled perspective view showing the construction for mounting the above rotary driving device.

As shown in FIG. 2, this rotary driving device 11 is provided in the central portion thereof with a fixed shaft 12, which has thrust bearings 13 and loosely coupled on opposite sides of the thrust bearings 13 thereof with slide shafts 14, respectively. Flange plates 15 are threadably fastened to opposite ends of the fixed shaft 12 and these flange plates are threadably coupled into openings on one side of locking nuts 16 and fixed thereto, and these locking nuts 16 are fixed to the body frame 1 through connecting collars 17 and U-shaped bolts 18 (Refer to FIG. 3).

The forward ends of a plurality of connecting bolts 21 are fixed to end faces positioned far way from each other, of the slide shafts 14 provided on the opposite sides of the thrust bearings 13, and the base end portions of the connecting bolts 21 are inserted through insertion holes 22 each being of a generally curved jewel shape (Refer to FIG. 4) formed in the flange plate 15, and thereafter, secured to a pedal axle 23 as being the input shaft. In this case, an interval between the slide shaft 14 and the pedal axle 23 is held at a predetermined value by spacers 24 coupled onto the connecting bolts 21, and the pedal axle 23 is loosely inserted through the locking nut 16.

Each of the pedal axles 23 is fixed thereto with a cap 25 through mounting bolts 26, each of the caps 25 is planted therein with a rocking arm 77, and a pedal 28 (Refer to FIG. 1) is provided at a rocking end of the rocking arm 27.

Figure 4:
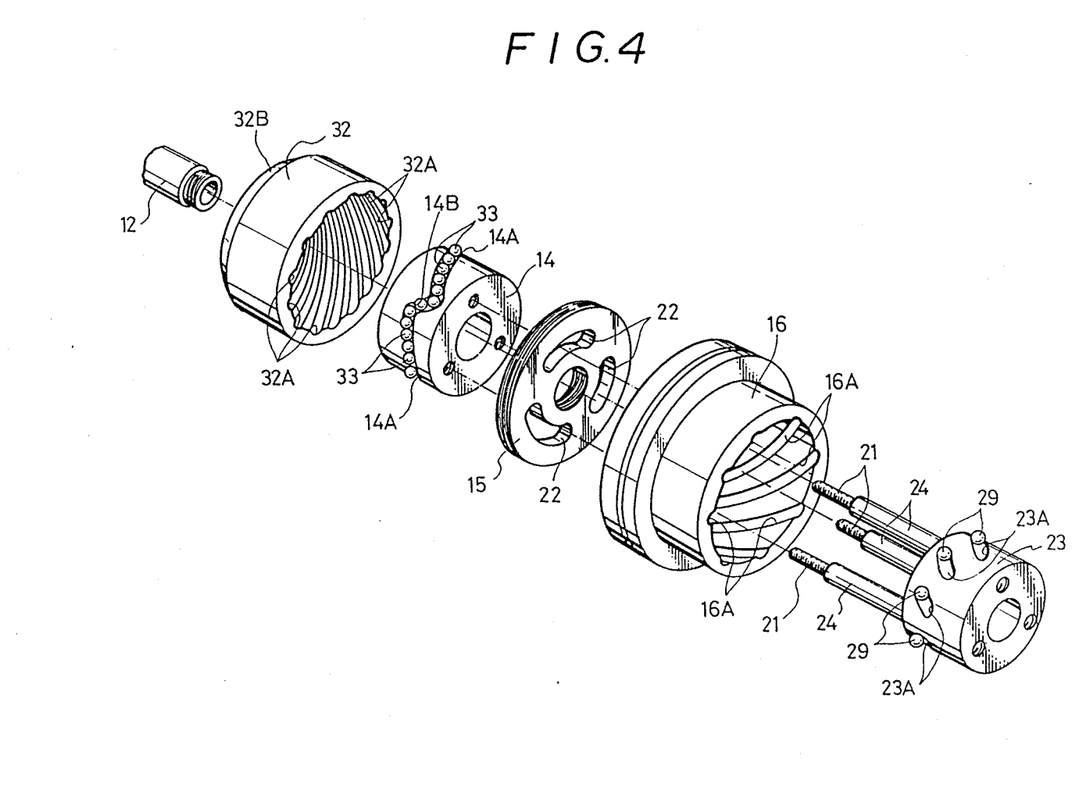
FIG. 4 is a disassembled perspective view showing the essential portions of the above rotary driving device.

As shown in FIG. 4, a plurality of grooves 23A being independent of one another are formed on the outer peripheral surface of the pedal axle 23 in right hand thread direction, and ball 29 is rotatably coupled into and held by each of the grooves 23A. On the other hand, grooves 16A each having a relatively large lead angle, e.g. 45° are formed on the inner peripheral surface of the locking nut 16 in right hand nut direction, and the aforesaid balls 29 are rotatably coupled into and held by these grooves 16A, whereby, when the pedals 28 are depressed to rotate the pedal axle 23, the pedal axle, i.e. the slide shaft 14 is forcedly moved toward the thrust bearing 13 (to the left in FIG. 2). Here, the both grooves 16A, 23A and the balls 29 constitute a rotation-axial movement converting mechanism 31 for converting a rotation of the pedal axle 23 (input shaft) into a movement including the axial movement thereof.

Coupled onto both of the slide shaft 14 at a certain interval are respective intermediate members 32, and formed on the inner peripheral surfaces of these intermediate members 32 are grooves 32A extending in a direction reverse to the grooves 16A on the inner peripheral surfaces of the locking nut 16 and having a small lead angle such for example as 8.13° as compared with the grooves 16A. On the other hand, formed on the outer peripheral surfaces of the slide shafts 14 in the right hand thread direction are a plurality, e.g. two of grooves 14A, balls 33 being rotatably coupled into and held by the grooves 14A and 32A, a torsionally connected portion being formed by the slide shafts 14 and the intermediate members 32 through these balls 33, and a movement being transmitted through this torsionally connected portion. Furthermore, end portions of the grooves 14A, adjoining to each other, communicate with each other by a deep groove 14B, the balls 33 in the grooves 14A passing through these deep grooves 14B, so that the balls 33 can move from the groove 14A to the other groove 14A adjoining thereto, getting over the grooves 32A. Here, both of the grooves 14A, 32A and the balls 33 constitute an axial movement-rotation transmitting mechanism 34 for transmitting an axial movement of the pedal axle 23 (input shaft) into a rotary movement accompanying an axial movement of the intermediate member 32. Furthermore, the groove 14A may be of one thread.

The end portions of both of the intermediate members 32, which are positioned far away from each other are rotatably supported by the locking nuts 16 through bearing balls 35, and tapered clutch surfaces 32B are formed on the end portions of both of the intermediate members 32, which are opposed to each other. A wheel axel 36 as being the output shaft is coupled onto both of the intermediate members 32, and this wheel axle 36 is rotatably supported at the opposite end portions thereof between both of the locking nuts 16 through bearing balls 37. A ridge portion 38 being a chevron shape in section is formed at the central portion in the axial direction of the inner peripheral surface of the wheel axle 36, and opposite side surfaces of this ridge portion 38 are formed into clutch surfaces 38A, which are opposed to the clutch surfaces 32B of the intermediate members 32 in a manner to be in contact therewith or be separate therefrom. Here, both of the clutch surfaces 32B and 38A constitute a clutch mechanism 41 for transmitting a rotation of the intermediate members 32 to the wheel axle 36 (output shaft) and for being connected or disconnected due to the axial movements of the intermediate members 32. The clutch surfaces 32B and 38A are constructed such that such a state may occur that both sides of the clutch surfaces 32B and 38A are simultaneously separated from each other, i.e. the state shown in FIG. 2 may occur, the interval therebetween is set only about at 0.1 mm for example. When the intermediate members 32 slightly move in any direction to the right or left from this state, the clutch mechanism 41 is connected.

The rear wheel 6 is mounted to the wheel axle 36 through spokes, not shown, and the like (Refer to FIG. 1). Interposed between the wheel axel 36 and the locking nuts 16 and between the cap 25 and the locking nuts 16 are seal members 42 and 43, whereby the sealing properties of the interior of this rotary driving device 11 can be highly held by these seal members 42 and 43.

Action of this embodiment will hereunder be described.

Now, when the pedal 28 at the rocking end of the rocking arm 27 shown to the right in FIG. 2 is depressed to rotate the rocking arm 27, the pedal axle 23 moves toward the thrust bearing 13 (to the left), rotating in the direction of depressing and being converted into the movement including an axial movement by the rotation-axial movement converting mechanism 31. The movement like this becomes the movement of the slide shaft 14 as it is, however, the leftward movement of this slide shaft 14 simultaneously carried out by the rotation in the direction of depressing is imparted to the intermediate member 32 on the right side by the axial movement-rotation converting and transmitting mechanism 34, the intermediate member 32, rotating in the direction of depressing, slightly moves to the left, whereby the clutch mechanism 41 is connected through the clutch surfaces 32B and 38A on the right side, so that the rotation of the intermediate member 32 can be imparted to the wheel axle 36 without slipping due to an angle of friction. In this case, due to the relationship between the lead angles of the grooves 32A, 14A and the lead angles of the grooves 16A and 23A, the intermediate member 32 is increased in rotation at a given speed ratio to the pedal axle 23. With this arrangement, the rear wheel 6 mounted to the wheel axle 36 is rotated in the direction of depressing, i.e. in the advancing direction, to obtain the driving force.

On the other hand, the slide shaft 14 on the left side in FIG. 2 is pushed to the left through the thrust bearing 13 by the leftward movement of the slide shaft 14 on the right side, whereby the pedal axle 23 on the left side is pushed to the left in the drawing by the axial movement-rotation converting and transmitting mechanism 34 and the rotation-axial movement converting mechanism 31, both of which are on the left side, while given a rotation in a direction reverse to the direction of depressing, so that the rocking arm 27 on the left side is risen. Furthermore, due to the leftward movement of the intermediate member 32 on the left side, the clutch mechanism 41 on the left side is disconnected.

Subsequently, when the pedal 28 of the rocking arm 27 on the left side in FIG. 2 is depressed to rotate the rocking arm 27, a movement bisymmetrical with the case of turning the rocking arm 27 on the right side is performed, the rotary movement of the pedal axle 23 on the left side is transmitted to the wheel axle 36 in the same manner as described above, to obtain the driving force, and the pedal axle 23 on the right side in the drawing is turned to raise the rocking arm 27 on the right side in the drawing. Thereupon, the right and left pedals 28 are alternately depressed in the same manner as described above, so that the rear wheel 6 can be continuously rotated in the advancing direction.

This embodiment with the above-described arrangement can offer the following advantages.

The interior of this rotary driving device 11 can be entirely sealed by totally four sealed portions (the right and left seal members 42 and 43), whereby, if lubricating oil is sealed in the rotary driving device for lubrication, then the device can be made completely free in maintenance as so-called.

Furthermore, the rotation-axial movement converting mechanisms 31 and the axial movement-rotation converting and transmitting mechanisms 34 are formed into so-called ball-thread constructions, wherein all of the contact portions are turned into rolling contacts, so that loss in the transmitted force due to the frictional contact and the like is low, thus improving the efficiency.

Moreover, in advancing merely by utilizing the inertial force without depressing the pedals 28, the positions of the right and left rocking arms 27 are fixed to suitable positions, e.g. the intermediate positions, whereby the both clutch mechanisms 41 are disconnected, so that the wheel 36 (rear wheel 6) can be rotated completely freely. Accordingly, as compared with the conventional case of using a free wheel, even during running by utilizing the inertial force, the pedals 28 and the wheel 6 are completely separated from each other, so that light and comfortable running with no loss in kinetic energy can be carried out. Furthermore, mechanical noises as in the case of the free wheel are not generated. More specifically, in the conventional bicycle, it is presupposed that the bicycle is normally ridden. Accordingly, it is considered the free wheel does not do so much work, so that the free wheel having a simplified construction is used, thus admitting the aforesaid loss in energy and generation of noises. On the other hand, according to the present invention, if a free wheel is used at the portions of the clutch mechanisms 41, then the free wheel is in a working state at least at one side of the clutch mechanisms 41, during inertial running, both sides of the clutch mechanisms 41 come into the working states, so that the conventional type free wheel cannot be used. In this embodiment, the clutch mechanisms 41 are completely disconnected during inertial running, so that no disadvantage of using the free wheel is presented.

Further, unlike in the conventional case where the sprocket, etc. provided at a position other than the rear wheel are rotated by a rotation of the pedals and the rotation of the sprocket is imparted to the rear wheel through the chain, the driving force of the right and left pedals 28 is directly transmitted to the wheel axle 36 of the rear wheel 6, so that the number of parts as a whole is small, which came contribute to easier inspection and lowered costs, further, the freedom in design of the body frame, etc. is enlarged, and particularly, non-use of the chain facilitates the bicycle to be turned into a collapsible one.

Incidentally, the pedal 28 may be either fixedly mounted or rotatably mounted on the forward end of the rotating arm, however, when tee top surface of the pedal 28 is finished to provide a circularly arcuate shape in section, necessity of rotatably mounting the pedal 28 onto the rocking arm 27 can be eliminated, thus offering an advantage of a more simplified construction. Furthermore, the balls 33 in the grooves 14A of the slide shafts 14 have been made to be the ones to be circulated by the deep grooves 14B, the circulating construction of the balls 33 need not necessarily be limited to this, and the balls 33 may be circulated at the outer side of the grooves 32A of the intermediate members 32. However, this embodiment offers such advantages that the outer diameter of this rotary driving device can be reduced and finishing is easy because of finishing on the outer periphery thereof.

The second embodiment of the present invention will hereunder be described with reference to FIGS. 5 to 8. Same reference numerals are used to designate same or similar parts and arrangements corresponding to the ones in the first embodiment, so that a description thereof will be omitted or simplified.

In this second embodiment, the rocking arm 27 is mounted to the cap 25 by couple-in joint and the connecting collar 17 is formed integrally with the U-shaped bolt 13, whereby mounting of the rotary driving device 11 to the body frame 1 is facilitated. Furthermore, the rotation-axial movement converting mechanism 31 is constituted by a cam member 50 and a cam follower 51 and the like, whereby the grooves 16A, 23A and the balls 29 in the first embodiment are swept away, whereby assembling and adjustment are facilitated. Further, a clutch regulating means 70 for regulating clearances between the clutch surfaces and a bearing regulating means 75 of the wheel axle 36 to the locking nut 16 are provided. The above-described respects are ones different from the first embodiment.

Figure 5:
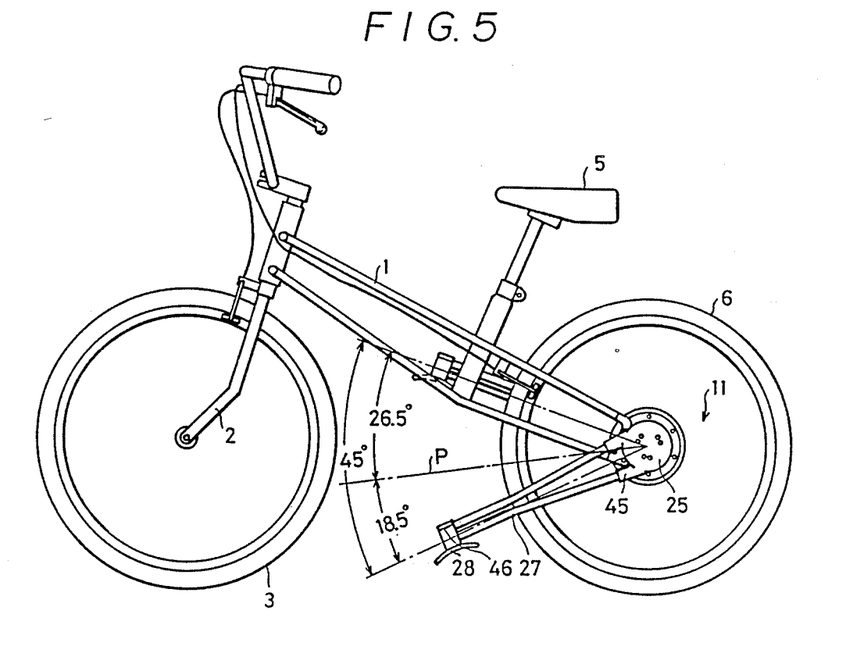
FIG. 5 is a side view showing the general arrangement of a second embodiment.
Figure 6:
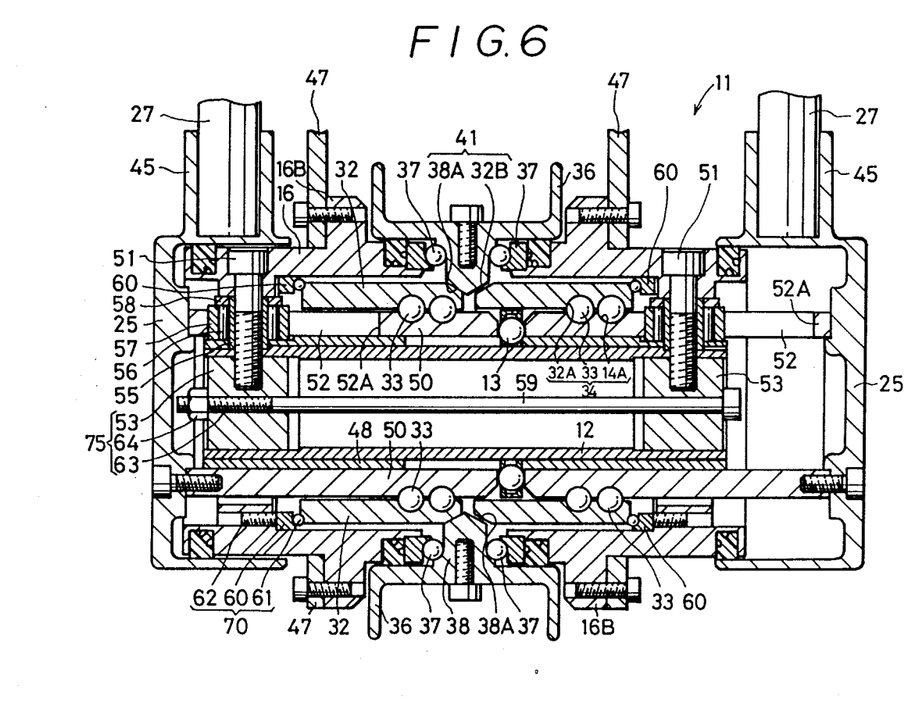
FIG. 6 is a sectional view showing the rotary driving device of the second embodiment.

In FIGS. 5 and 6, a tubular portion 45 for receiving the proximal end of the rocking arm 27 to make it possible to mount the rocking arm 27 is formed on the outer peripheral portion of the cap 25. This tubular portion 45 is made of cast iron or the like, integrally formed on the cap 25. In this case, suitable bolts and the like may be used between the tubular portion 45 and the rocking arm 27 to make the connection therebetween more firm. A toe clip 46 is provided on the top side of the pedal 28 provided at the forward end of the rocking arm 27. The top surface of an instep of a foot is engaged with this toe clip 46, so that the rocking movement of the rocking arm can be performed more smoothly. Raised portions 16B are formed at positions interposing the wheel axle 36, on the outer peripheral surfaces of the locking nuts 16. Threadably coupled and fixed to the raised portions 16B are connecting rings 47 each obtained by integrating the connecting collar 17 and the U-letter shaped bolt 18.

Figure 7:
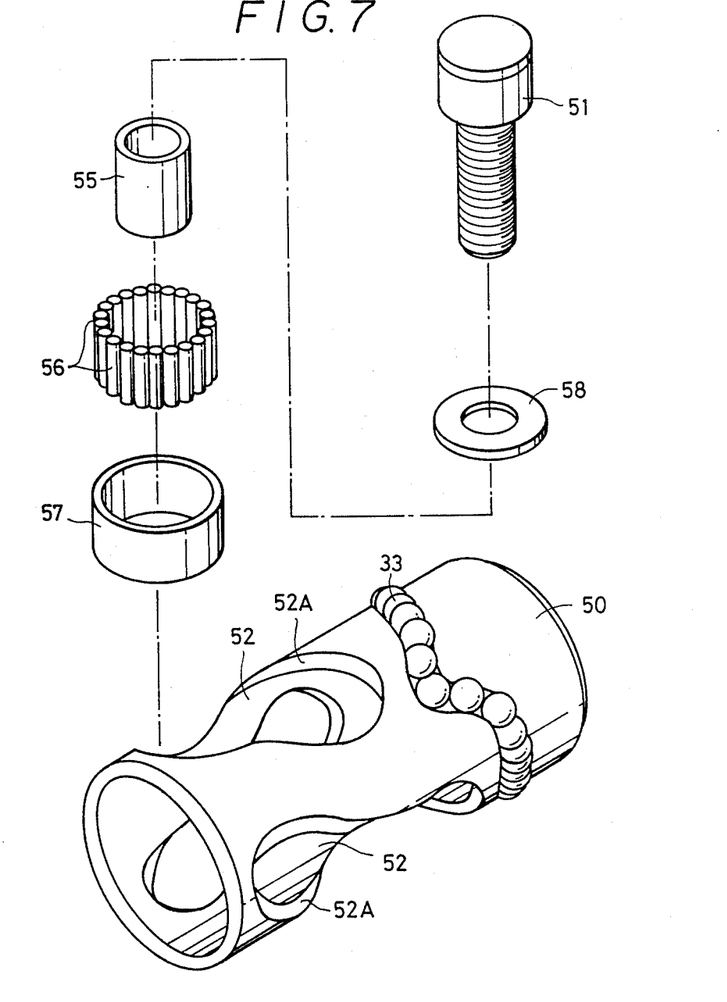
FIG. 7 is a disassembled perspective view showing the essential portions thereof.
Figure 8:
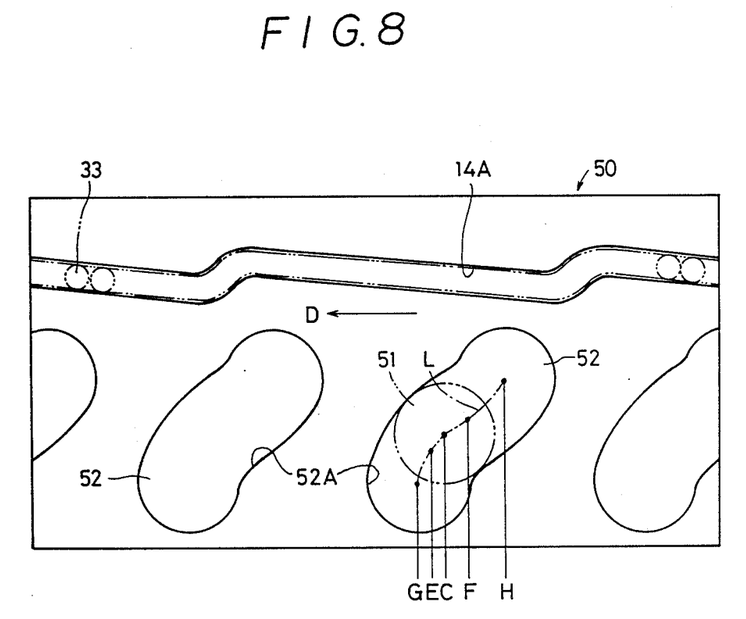
FIG. 8 is an unfolded view showing the cam members.

As shown in FIG. 7, the cam member 50 is generally formed into a substantially tubular shape and corresponds to the one obtained by integrating the connecting bolt 21, the pedal axle 23 as being the input shaft and the slide shaft 14, in the first embodiment. This cam member 50 is rotatably and axially movably coupled onto the outer peripheral surface of the fixed shaft 12 through a tubular oilless metal 48. Furthermore, formed on one side of the outer periphery of this cam member 52 are grooves 14A and deep grooves 14B which are formed by two-start thread similarly to the first embodiment. The balls 33 are provided between the grooves 14A, the deep grooves 14B and intermediate members 32A. And, the cam member 50 and the intermediate members 32A constitute a torsionally connected portion. The cam member 50 is penetratingly provided on the peripheral surface thereof with cam holes 52 at the circumferential intervals of 120°. Inserted through each of these cam holes 52 is a cam follower 51 penetrating through the locking nut 16. The forward end portion of this cam follower 51 is threadably coupled and fixed to a lock nut 53 which is coupled and fixed into the fixed shaft 12. The cam hole 52 is constructed such that, when the axis of the cam follower 51 is positioned at the center point C of the cam hole 52 (Refer to FIG. 8), the respective rocking arms 27 are arranged at positions of height on a level equal to each other (Refer to a line P in FIG. 5), whereby these rocking arms 27 are allowed to have angles of movement of about 18.5° from the line P to the lower limit and about 26.5° from the line P to the upper limit, and to have an angle of rotation of 45°at the maximum. As shown in FIG. 8, a surface 52A forming this cam hole 52 is determined such that the cam member 50 rotates and moves to the right and left, drawing a moving path L which passes through the center point C on the stationary side of the cam follower 51. Between the points C and F, the rocking arms 27 may be rocked by a relatively weak depressing force. Between the points C and G, and between points F and H, the rocking arms 27 should be rocked by the gradually stronger depressing force. Incidentally, the point E shows a corresponding position when the center of the cam follower 51 in the cam member 50, which is associated with the rocking arm 27 positioned at a side opposite thereto, coincides with the F point. Reference character D indicates a direction in which the cam follower 51 moves relative to the cam member 50 when the pedal 28 is depressed.

With this arrangement, in the case where the rocking arms 27 are rocked from the initial position of the point P, at which the rocking arms 27 are at the heights equal to each other, when the cam member 50 moves in the range between the points E and F, only a driving force of a low value can be obtained, accordingly, rocking of the rocking arm 27 can be performed by a weak depressing force. On the other hand, when the cam member 50 moves in the ranges between the points E and G and between the points F and H, a driving force of a high value can be obtained, accordingly, a strong depressing force is required.

An inner sleeve 55 is coupled onto the outer periphery of the cam follower 51, and an outer sleeve 57 is coupled onto the outer peripheral surface of this inner sleeve 55 through a plurality of needles 56. With this arrangement, the outer sleeve 57 is made rotatable, and, along the outer peripheral surface of this outer sleeve 57, the cam member 50 can rotate and axially move in accordance with the shape of the end face forming the cam hole 52.

An adjusting ring 60 and balls 61 are provided between the locking nut 16 and the intermediate member 32. Abutted against the adjusting ring 60 are the forward ends of the adjusting screws 62 threadably coupled into the locking nut 16. The threadably coupled-in positions of the adjusting screws 62 are adjusted so as to adjust a clearance between the clutch surface 32B formed on the intermediate member 32 and the clutch surface 38A on the side of the wheel axle 35. Here, the adjusting ring 60, the balls 61 and the adjusting screws 62 constitute a clutch regulating means 70.

The lock nut 53 is clamped by a bolt 63 extending through the fixed shaft 12 and a nut 64. Adjusting of this clamping makes it possible to adjust abutting against the balls 37 by the locking nut 16 and the wheel axle 36, said balls 37 being provided therebetween. Here, the lock nut 53, the bolt 63 and the nut 54 constitute a bearing regulating means 75 of the wheel axle.

Action of the second embodiment will hereunder be described.

In a state shown in FIG. 6, the pedal 28 of the rocking arm 27 on the left side is depressed, whereby the clutch surfaces 32B and 38A are brought into contact with each other, so that the rotary driving force is given. Here, in FIG. 6, when the pedal 28 of the rocking arm 27 on the right side is depressed, the cam member 50 moves to the left in the drawing, rotating along the end face forming the cam hole 52 thereof, because the cam follower 51 is inserted through the cam member 50. At this time, the end face of the cam member 50 on the right side pushes the cam member 50 on the left side to the left through the ball 13, whereby the clutch surfaces 32B and 38A, which have been in contact with each other, are disconnected from each other, and simultaneously, the intermediate member 32 on the right side moves to bring the clutch surface 32B of the intermediate member 32 and the clutch surface 38A on the side of the wheel axle 36 into contact, so that the rotary driving force of the intermediate member 32 can be transmitted to the wheel axle 36. Thereupon, the operations similar to the above are repeated, so that the rear wheel 6 can be continuously rotated in the advancing direction. Incidentally, in order to slowly run the bicycle by light depressing, the rocking arms should be rocked about the line P with short and quick steps. In order to obtain the driving force of a high value, the rocking arms 27 should be rocked in the full scope of rocking.

The second embodiment with the above-described arrangement can add such advantages that, in mounting this rotary driving device 11 onto the body frame 1, easier mounting can be realized, the rotation-axial movement converting mechanisms 31 can be further simplified in construction, and assembling can be much facilitated.

The second embodiment is advantageous in that the provisions of the clutch regulating means 70 and the bearing regulating means 75 make it possible to carry out a fine adjustment such as so-called clear-cut disconnecting conditions of the clutches, even if errors of finishing occur, the errors can be coped with without difficulties, spots between this rotary driving device 11 and the wheel axle 36 can be adjusted even after the assembling, so that the regulation in rotating can be smoothly achieved.

Figure 9:
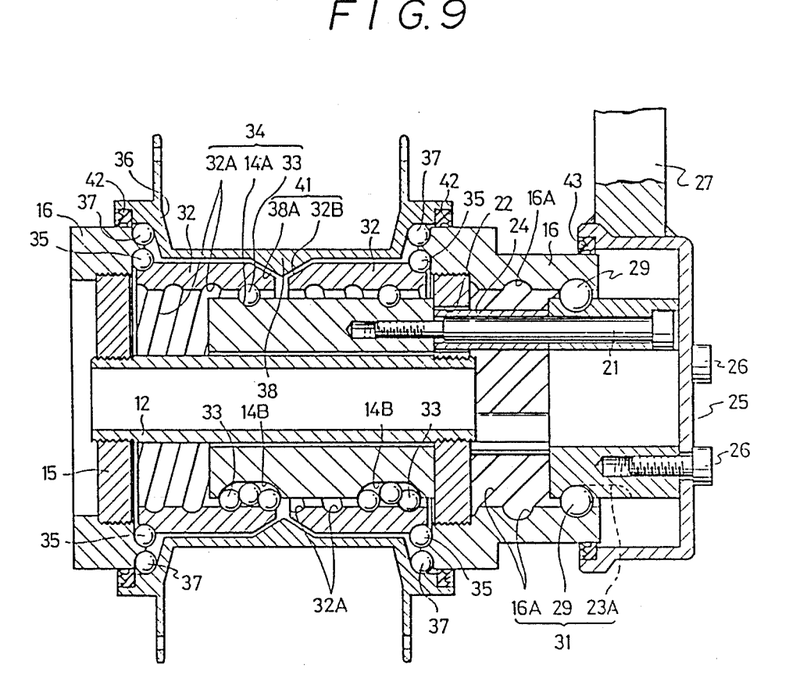
FIG. 9 is a sectional view showing an example of a modification other than the above.

Incidentally, the present invention need not necessarily be limited to the above embodiments, and, as shown in FIG. 9 for example, only one rocking arm 27 may be provided only on one side. In this case, the two intermediate members 32 are connected to the groove 14A directed in the reverse direction provided in one of the slide shaft 14. In this embodiment, the rocking arm 27 can be driven not only when the rocking arm 27 is pushed in, but also when the rocking arm 27 is raised. Accordingly, the present invention is suitable for the manual wheelchair and the like.

Furthermore, the present invention may be applied not only to the bicycle, but also the rollerthrough, the buggy, and the wheelchair with a driving mechanism such as a handle-driven wheelchair. Furthermore, the present invention is applicable widely to carriages other than the above vehicles.

Further, the pedal axle 23 as being the input shaft need not necessarily be limited to the one which is rotatably driven, and may be the one being driven directly in the axial direction by a linearly movable driving force such as an air cylinder.

Moreover, in the clutch mechanism 41, the angles of the tapered surfaces 32B and 38A are set in relation with the lead angle of the groove 32A of the intermediate member 32. The smaller the lead angle is, the smaller the vertical angle of the ridge portion 38 can be set, whereby a lock, a so-called bite on the tapered surface portion can be avoided, however, the movement converting efficiency at the portion of the groove 32A is lowered, so that the setting is performed by a compromise therebetween. As the case may be, as the clutch mechanism 41, not only the tapered clutches, plate clutches such as single-plate clutch or a multi-plate clutch may be used.

In the foregoing, the example in which this rotary driving device 11 is provided on the rear wheel is shown, however, the present invention need not necessarily be limited to this, and the rotary driving device may be provided on the front wheel.

As has been described hereinabove, the present invention can provide the rotary driving device wherein the number of parts is small, the cost is low, the completely sealed construction is adopted as necessary, and the maintenance is easily made free.

What is claimed is:

1. A rotary driving device comprising:
an input shaft means adapted to be driven at least in an axial direction thereof by means of an external rotatable driving source operating through a rotation-axial movement converting means;
an output shaft means and support means for supporting said output shaft for rotation;
an intermediate member between said input shaft means and said output shaft means adapted to be moved rotationally and axially;
an axial movement-rotation converting and transmitting means for converting the axial movement of said input shaft means into a rotary movement and an accompanying axial movement of said intermediate member through a torsionally connected and transmitting means; and
a clutch means between and engagable with said intermediate member and said output shaft, said clutch means being engaged or disengaged from said intermediate member in response to an axial movement of said intermediate member, for imparting a rotation from said intermediate member to said output shaft due to a frictional force of said clutch means when engaged.

2. A rotary driving device comprising:
a pair of axially aligned input shafts, inner ends thereof which oppose each other being rotatable through a thrust bearing and movable in the axial direction thereof simultaneously and in the same direction;
an output shaft means and support means for supporting said output shaft for rotation;
a pair of intermediate members, one each between a respective one of said input shafts and said output shaft;
an axial movement-rotation converting and transmitting means for converting the axial movement of said input shaft means into a rotary movement and an accompanying axial movement of said intermediate members through a torsionally connected and transmitting means; and
a clutch means between and engagable with said intermediate members and said output shaft, said clutch means being engaged or disengaged from said intermediate members in response to an axial movement of said intermediate members, for imparting a rotation from said intermediate members to said output shaft due to a frictional force of said clutch means when engaged, said intermediate members associated with said respective input shafts being connected to one and the same output shaft through said clutch means.

3. A rotary driving device comprising:
an input shaft means adapted to be driven at least in an axial direction thereof by means of an external rotatable driving source operating through a rotation-axial movement converting means;
an output shaft means and support means for supporting said output shaft for rotation;
an intermediate member between said input shaft means and said output shaft means adapted to be moved rotationally and axially, said input shaft means including a cam member for performing a rotational-axial movement, said cam member being torsionally connected to said intermediate member, said cam member being formed into a tubular shape, plural cam holes in said cam member, each having a given lead angle at intervals of 120° in the circumferential direction thereof, and cam followers for driving said input shafts in the axial direction thereof being received in said cam holes;
an axial movement-rotation converting and transmitting means for converting the axial movement of said input shaft means into a rotary movement and an accompanying axial movement of said intermediate member through a torsionally connected and transmitting means; and
a clutch means between and engagable with said intermediate member and said output shaft, said clutch means being engaged or disengaged from said intermediate member in response to an axial movement of said intermediate member, for imparting a rotation from said intermediate member to said output shaft due to a frictional force of said clutch means when engaged.

4. A rotary driving device comprising:
an input shaft means adapted to be driven at least in an axial direction thereof by means of an external rotatable driving source operating through a rotation-axial movement converting means;
an output shaft means and support means for supporting said output shaft for rotation;
an intermediate member between said input shaft means and said output shaft means adapted to be moved rotationally and axially;
an axial movement-rotation converting and transmitting means for converting the axial movement of said input shaft means into a rotary movement and an accompanying axial movement of said intermediate member through a torsionally connected and transmitting means; and
a clutch means between and engagable with said intermediate member and said output shaft, said clutch means being engaged or disengaged from said intermediate member in response to an axial movement of said intermediate member, for imparting a rotation from said intermediate member to said output shaft due to a frictional force of said clutch means when engaged, said clutch means including a pair of opposing surfaces which are engaged to or disengaged from each other, and a clutch regulating means for adjusting a clearance between said surfaces.

5. The rotary driving device as set forth in claim 4, wherein said clutch regulating means includes balls abutted against end portions of said intermediate members, which end portions face away from each other, and adjusting screws for pressing said intermediate members toward each other through said balls.

6. A rotary driving device comprising:
an input shaft means adapted to be driven at least in an axial direction thereof by means of an external rotatable driving source operating through a rotation-axial movement converting means;
an output shaft means and support means for supporting said output shaft for rotation, said support means including plural balls, and a means for regulating the abutting of said output shaft against said balls;
an intermediate member between said input shaft means and said output shaft means adapted to be moved rotationally and axially;
an axial movement-rotation converting and transmitting means for converting the axial movement of said input shaft means into a rotary movement and an accompanying axial movement of said intermediate member through a torsionally connected and transmitting means; and
a clutch means between and engagable with said intermediate member and said output shaft, said clutch means being engaged or disengaged from said intermediate member in response to an axial movement of said intermediate member, for imparting a rotation from said intermediate member to said output shaft due to a frictional force of said clutch means when engaged.

7. The rotary driving device as set forth in claim 6, wherein said regulating means includes at least one bolt and lock nut, whereby clamping positions of said bolt and lock nut is regulated.

* * * * *